(12) United States Patent
Stedman et al.

(10) Patent No.: US 6,598,724 B1
(45) Date of Patent: Jul. 29, 2003

(54) WHEEL HUB

(76) Inventors: Kenneth Brian Stedman, 9A Boss Hall Road, Ipswich, Suffolk IP1 5BN (GB); Iain Robert Warner, 8 Roy Close, Kesgrave, Ipswich, Suffolk IP5 7JR (GB)

( * ) Notice: Subject to any disclaimer, the term of this patent is extended or adjusted under 35 U.S.C. 154(b) by 0 days.

(21) Appl. No.: 09/914,661

(22) PCT Filed: Feb. 29, 2000

(86) PCT No.: PCT/GB00/00713
§ 371 (c)(1),
(2), (4) Date: Dec. 17, 2001

(87) PCT Pub. No.: WO00/51870
PCT Pub. Date: Sep. 8, 2000

(30) Foreign Application Priority Data

Mar. 1, 1999 (GB) .............................. 9904607

(51) Int. Cl.⁷ ................................. B62B 5/04
(52) U.S. Cl. .................. 192/217; 188/2 F; 280/304.1
(58) Field of Search ............... 92/217.3, 17 R, 92/12 B, 217; 188/2 F, 31; 280/250.1, 304.1

(56) References Cited

U.S. PATENT DOCUMENTS

| | | | | |
|---|---|---|---|---|
| 1,566,405 A | * | 12/1925 | Jones ......................... 188/31 |
| 3,438,283 A | | 4/1969 | Schwerdhofer ............... 74/750 |
| 3,637,243 A | * | 1/1972 | Kitano et al. ................ 403/1 |
| 4,045,047 A | * | 8/1977 | Buckley ..................... 280/250.1 |
| 4,520,804 A | | 6/1985 | DiGeorge ..................... 128/80 |
| 4,727,965 A | | 3/1988 | Zach et al. .................. 192/6 A |
| 4,762,332 A | | 8/1988 | Seol .......................... 280/242 |
| 5,160,156 A | | 11/1992 | Mendon ..................... 280/250.1 |
| 5,184,837 A | | 2/1993 | Alexander ................. 280/250.1 |
| 5,197,750 A | | 3/1993 | DiGeorge ................. 280/250.1 |
| 5,401,044 A | * | 3/1995 | Galumbeck ............ 301/111.03 |
| 5,482,305 A | | 1/1996 | Jeffries et al. ........... 280/250.1 |
| 5,486,016 A | | 1/1996 | Godin et al. ............. 280/250.1 |
| 5,727,850 A | * | 3/1998 | Masclet .................. 301/111.03 |
| 5,743,544 A | * | 4/1998 | Weaver ...................... 188/2 F |
| 5,746,437 A | * | 5/1998 | Faber ....................... 280/340.1 |
| 6,378,663 B1 | * | 4/2002 | Lee ............................. 188/2 F |

FOREIGN PATENT DOCUMENTS

| | | |
|---|---|---|
| DE | 2929138 A1 | 2/1981 |
| EP | 0220734 A2 | 10/1986 |
| EP | 0 684 177 A2 | * 11/1995 |
| EP | 0836843 A1 | 4/1998 |
| GB | 2291019 | 1/1996 |
| WO | WO94/20323 | 9/1994 |

OTHER PUBLICATIONS

A magazine article in German regarding a two gears wheelchair. 1989 Title: Ein Rollstuhl Mit Zwei Gängen, J. W. Ziegle, *4520 Medizinisch–Orthopadische Technik*, No. 5.

\* cited by examiner

*Primary Examiner*—Rodney H Bonck
(74) *Attorney, Agent, or Firm*—Kirton & McConkie; Michael F. Krieger

(57) ABSTRACT

A wheel hub (10), primarily for a wheelchair wheel, can be manually operated by rotating a cover (168) to give three different operating states for the wheel which includes the hub. In the first position, the wheel is free to rotate relative to the chair. In the second position, the wheel is locked to the chair, i.e. the chair is braked. In the third position, the wheel can turn in the direction corresponding to forward motion of the chair, but cannot rotate in the opposite direction. This prevents the wheelchair from undesired backward rolling movement.

23 Claims, 5 Drawing Sheets

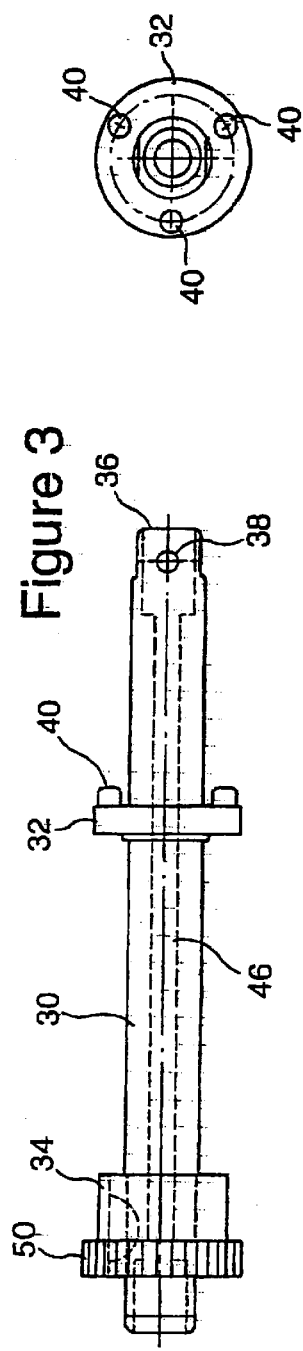
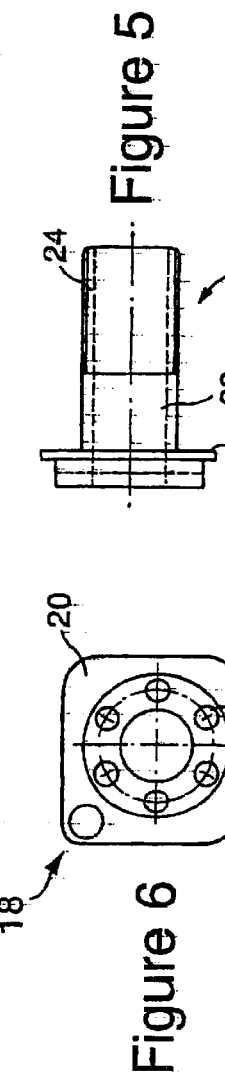
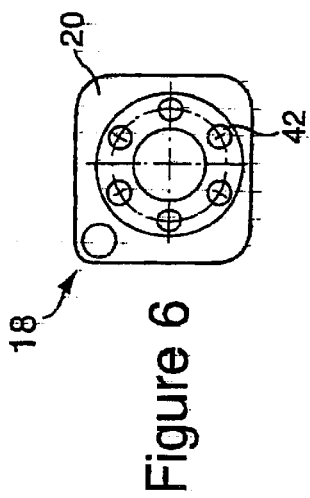
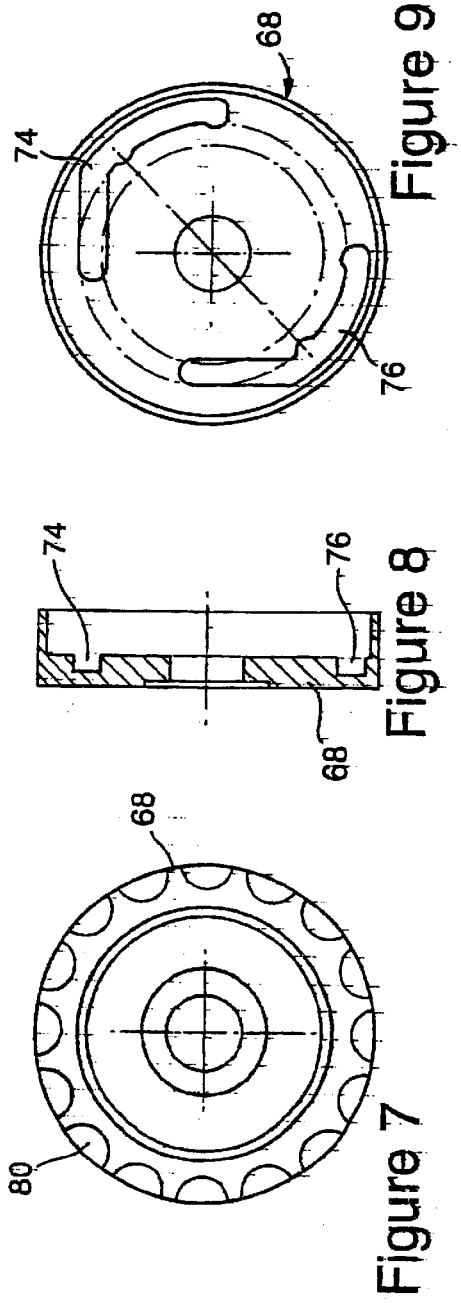
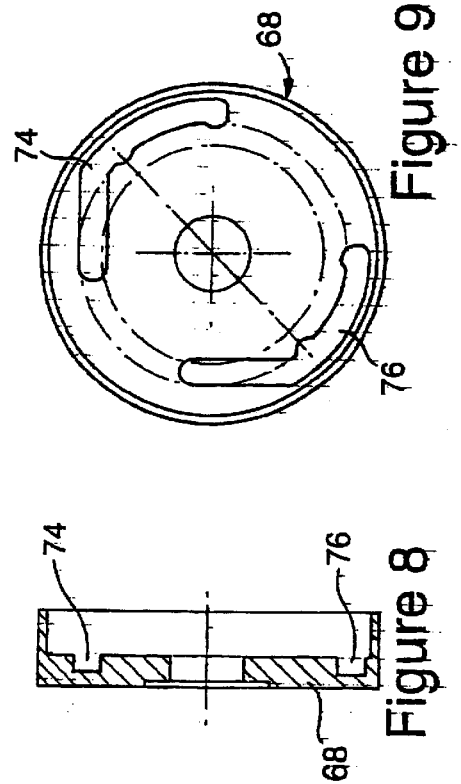

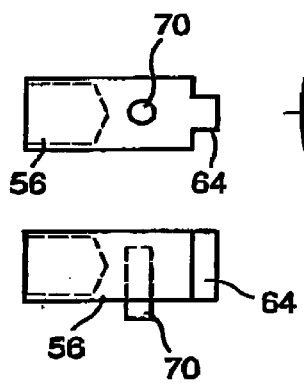
Figure 13
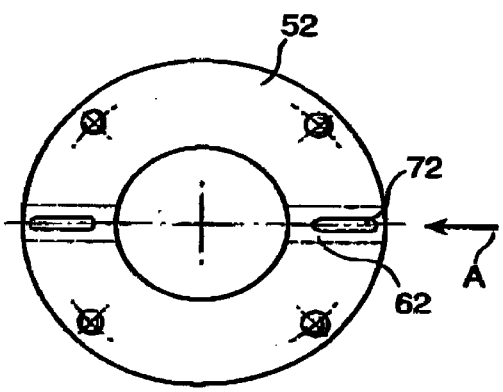
Figure 10
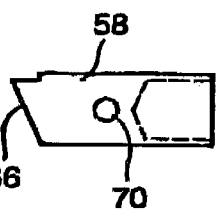
Figure 12
Figure 14
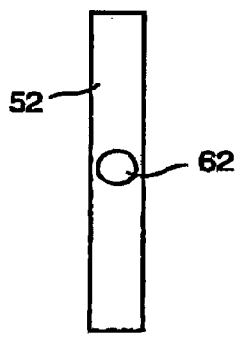
Figure 11

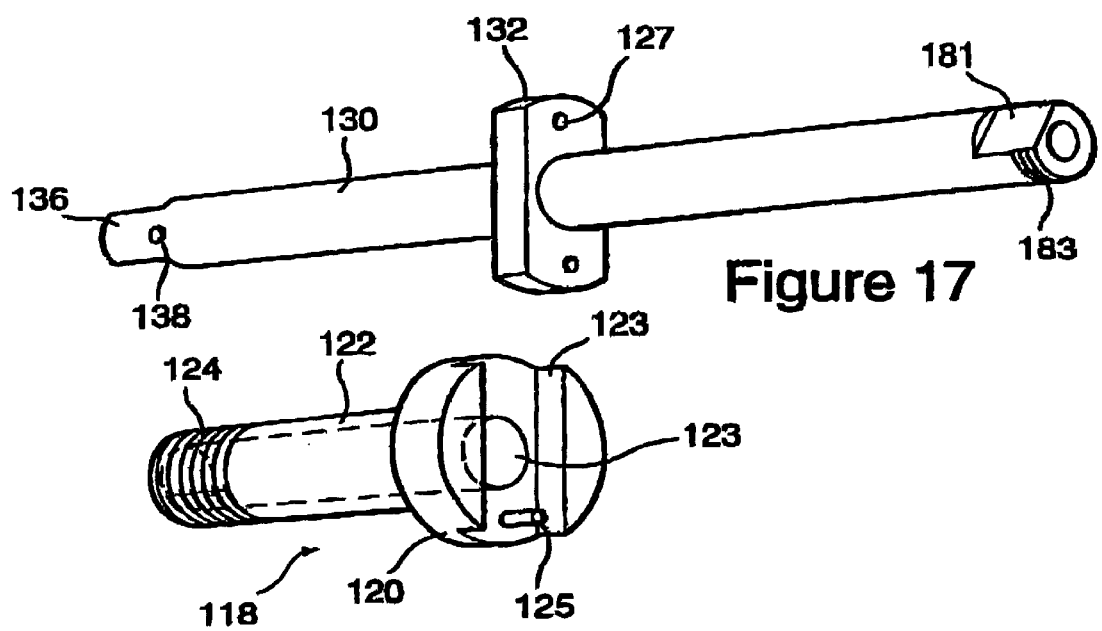

WHEEL HUB

This invention relates to a wheel hub, particularly but not exclusively to a hub for a wheelchair wheel.

Wheelchairs are used by physically handicapped people to give them mobility. They are conventionally propelled by the user who rotates handwheels fixed to the road wheels. The handwheels are centred on the axis of rotation of the road wheels. In most cases, the handwheels are rigidly fixed to the road wheels so that one revolution of the hand wheels equates to one revolution of the road wheels.

When the wheelchair is stationary, a brake should be applied to prevent the wheelchair from moving unintentionally. It is known to use brakes which press against the tyre of the road wheel.

EP-A-0 220 734 describes a wheelchair brake which can be set in three different positions. In one position there is no restraint on the wheel which can rotate freely in either direction. In a second position the wheel can only rotate in one (forwards) direction. In the third position, the wheel is braked and cannot rotate at all.

According to the invention, there is provided a wheel hub which comprises a spindle, a sleeve rotatable relative to the spindle through a bearing, and a manually operable device which has three operating positions, a first of which allows free rotation between the spindle and the sleeve, a second of which locks the spindle to the sleeve to effect a braking action, and a third of which engages a ratchet arrangement which allows the spindle to rotate relative to the sleeve in one direction only, characterised in that the manually operable device is fitted on the hub. Fitting the manually operable device on the hub allows the wheel to be easily attached and reattached to the wheelchair frame without having to dismantle the mechanism which controls the wheel rotation.

The wheel hub is particularly intended for use on the wheels of a wheelchair. A hub will be fitted at the centre of each of the main driving wheels of the chair.

The ratchet arrangement produces a feature referred to as 'anti-rollback'. In other words, this position is engaged by the user when the wheelchair is going uphill and prevents the wheel chair from rolling back down the hill if the user stops turning the handwheels.

The selection of one of the three positions is preferably carried out by manipulating a selector mounted on the hub itself. The selector may be a rotatable disc mounted for rotation about an axis coincident with the hub axis. The selector may have a central position corresponding to the first operating position, with the second and third operating positions being reached by rotating the selector in one direction for the second operating position and in the opposite direction for the third operating position.

The disc can have a radially outwardly extending lever to enable it to be turned, or may have a circumferential surface modified to allow it to be gripped and turned. For example the surface, may be provided with a rubber ring, or may be formed with a type of knurling or similar to increase grip.

The spindle is preferably provided with a mounting bracket by which it can be non-rotatably mounted on the wheelchair frame. This bracket may have axially extending pins or sockets which engage with axially extending sockets or pins on the hub. The hub is preferably provided with a quick detachment mechanism enabling the hub (together with a wheel attached to the hub) to be quickly and easily detached from the wheelchair frame. The spindle may have a radial projection at its inner end which can be retracted to enable the spindle to be inserted in or withdrawn from the mounting bracket. When the projection is extended, relative axial movement between the spindle and the mounting bracket cannot take place, and when the pins and sockets are engaged with one another rotational movement between the spindle and the bracket cannot take place.

The manually operable device preferably comprises a splined annular surface on the spindle surrounded by a body on the sleeve which has a recess in which the splined surface lies so that the body is free to rotate relative to the spindle, and to the splined surface on the spindle, when the hub takes up the first operating position, the device also including a first pin or pins, fixed against rotation relative to the sleeve, which can be moved from a retracted position into the path of relative rotational movement between the body and the splined annular surface to engage with the splines and to thus prevent rotation of the sleeve relative to the spindle (the second operating position) and a second pin or pins, also fixed against rotation relative to the sleeve which can be moved into the path of relative rotational movement between the body and the splined annular surface, when the first pin or pins is in a retracted position, to engage with the splines and to prevent rotation of the sleeve in one rotational direction relative to the spindle but to allow rotation in the opposite rotation direction.

The first pin or pins may have square end profiles which engage between splines on the splined surfaces and the second pin or pins may have end profiles with one square face and one ramp face which engage between splines on the splined surfaces, so that the square face prevents rotation of the sleeve in one rotational direction relative to the spindle and the ramp face allows rotation in the opposite rotation direction. The first pin or pins are preferably diametrically opposite (referred to the spindle axis) to the second pin or pins.

In one embodiment, the body on the sleeve has radially extending passages communicating with the recess and the pins are radially movable pins which can move in and out of the recess to engage, one at a time, with the splined surface. The radially movable pins have lateral lugs which engage in cam tracks inside the selector so that movement of the selector in one rotational direction extends the first pins and movement in the opposite rotational direction extends the second pins.

In another embodiment, the body on the sleeve comprises a radially movable slide plate moving between two fixed parallel slide guides such that the plate can move radially but cannot rotate relative to the guides, the recess being provided in the slide plate and the pine being formed integrally with the plate at opposite regions of the circumference of the recess. Leaf springs mounted internally on the selector bias the opposite ends of the slide plate and, the slide plate ends and the leaf springs are designed so that movement of the selector in each direction causes the leaf springs to ride over a none on the slide plate so that the selector is held in one or other ed position until the selector in manually operated to a different position.

There may be two first pins and two second pins.

The invention also extends to a wheelchair wheel having a hub as set forth above, and to a wheelchair having wheels of this type.

The invention will now be further described, by way of example, with reference to the accompanying drawings, in which:

FIG. 3 is a side view of a spindle;

Figure 15:
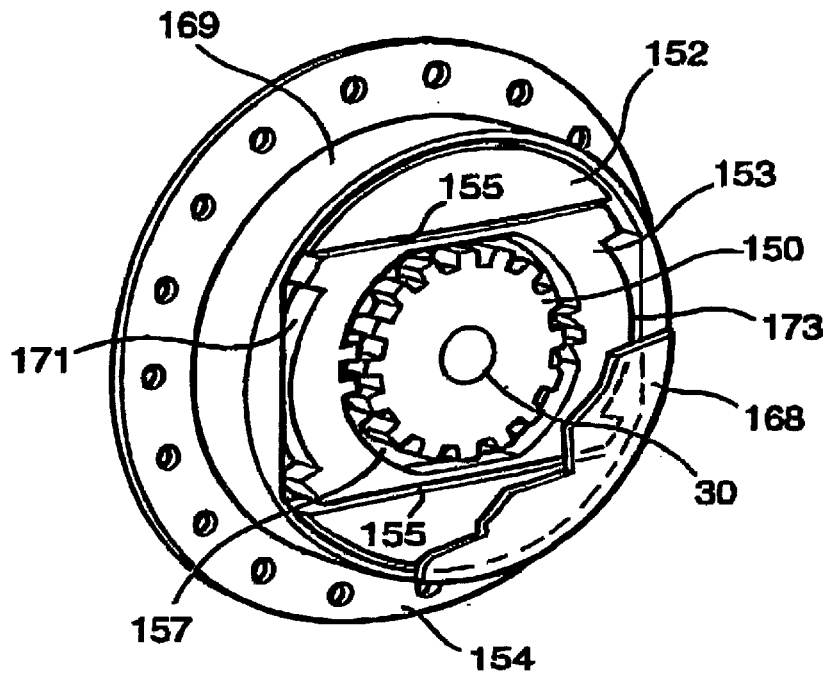
Figure 16:
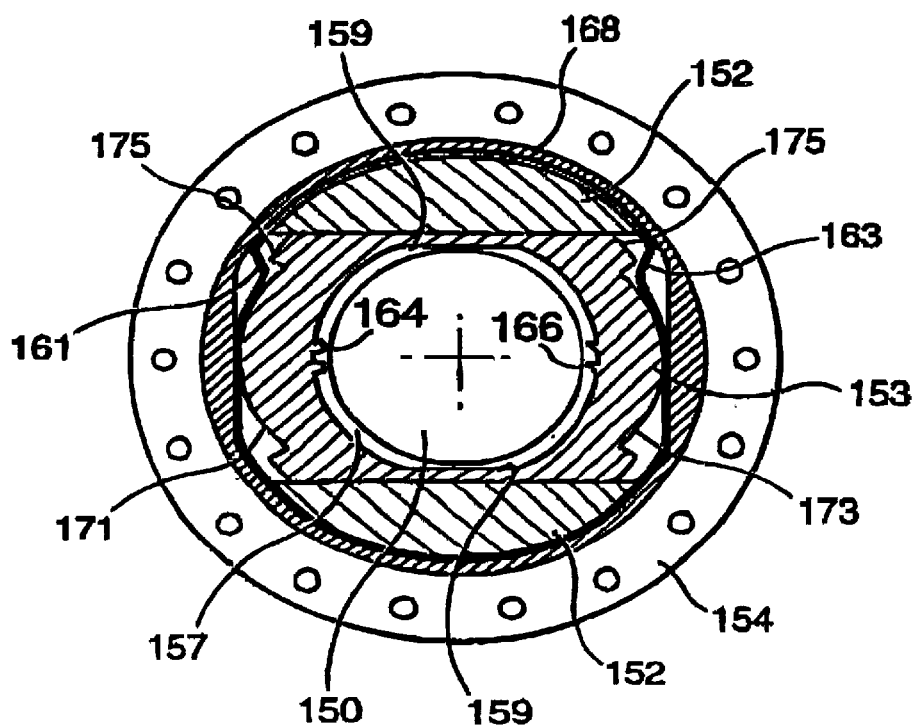

FIG. 4 is an end view of the spindle of FIG. 3;
FIG. 5 in a side view of a mounting collar;
FIG. 6 is an end view of the collar of FIG. 5;
FIG. 7 is a front view of a cover for the mechanism of FIG. 2;
FIG. 8 is a cross-section through the cover of FIG. 7;
FIG. 9 is an rear view of the cover shown in FIG. 7, showing the interior of the cover;
FIG. 10 is a front view of a centre disc forming part of the mechanism of FIG. 2;
FIG. 11 is a side view on the arrow A of the disc of FIG. 10;
FIG. 12 shows a ratchet pin;
FIG. 13 is a top view of a lock pin;
FIG. 14 is a side view of the lock pin shown in FIG. 13;
FIG. 15 is a perspective view, partly cut away, of a second embodiment of hub in accordance with the invention;
FIG. 16 is a plan view of the hub of FIG. 15 showing additional components; and
FIG. 17 is an exploded view of a spindle for use with the hub of the invention.

Figure 1:
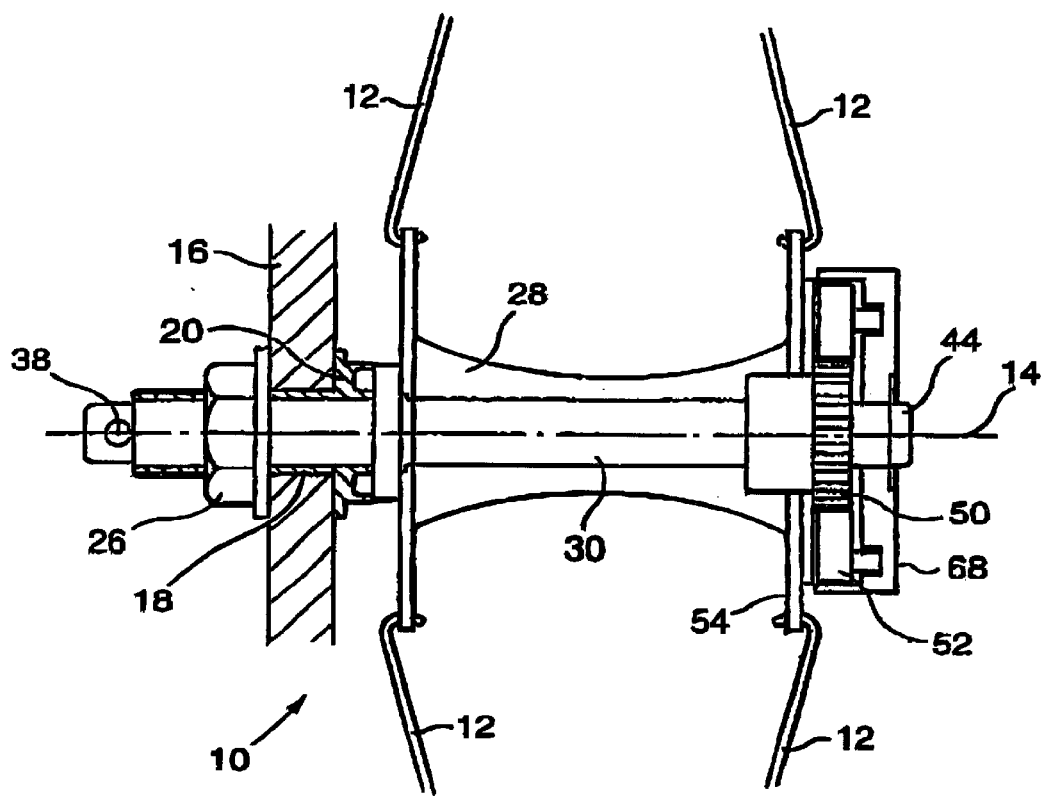
FIG. 1 is a side view, partly in section, of a hub in accordance with the invention.

FIG. 1 show a hub assembly generally designated 10 with a hub body 28. The hub body is connected to a wheel rim (not shown) by spokes 12 in a conventional manner. The hub has an axis of rotation at 14, and is mounted for rotation relative to a wheelchair frame 16, only a small part of which is show in the drawing.

The hub assembly includes a collar 1 (FIGS. 5 and 6) with a shoulder 20, a hollow shaft 22 and a threaded region 24. The shaft 22 is passed through the wheelchair frame 16, and a nut 26 is tightened onto the threaded portion 24 to fix the collar 16 to the wheelchair frame 16.

As a separate component, the hub body 28 is fitted onto a spindle 30 (FIG. 3) and secured on the spindle between a flange 32 and a nut 34. The body 28 has an integral bearing which allows the body to rotate relative to the spindle 30. The assembly of the wheel with spokes 12, body 28 and spindle 30 can then be mounted in the collar 18 by inserting the left hand end 36 of the spindle into the bore 22 of the collar. A spring loaded retention hall 38 can be pressed back into the spindle 30 to allow the spindle to pass through the bore 22. The spindle will be prevented from rotating relative to the collar 18 by the engagement of pins 40 on the shoulder 32 in holes 42 on the shoulder 20. There may be for example three pine 40 on the spindle and six holes 42 on the shoulder, so that the two can engage in a number of different angular positions.

The mechanism by which the wheel and the spindle can be withdrawn from the collar 18 is similar to that described in U.S. Pat. No. 5,727,850. A push button 44 on the end of a rod 46 can be pushed in to release radial pressure on the projecting retention ball 38, and whilst this pressure is maintained on the push button, the spindle 30 can be withdrawn from the collar 18.

The parts of the hub which control its operation will now be described.

A part 50 of the nut 34 has a raised circumference with a splined or castellated rim. When the nut 34 is tightened to secure the body 28, the nut 34 and the rim 50 are fixed to the spindle 30. An outer annular disc 52 (FIG. 2) is fixed to the flange 54 of the hub body 28. Located in radial passages in the annular body 52 are two pins 56 and 58. One pin 56 is responsible for braking the wheel and the other pin 58 is responsible for providing an anti-rollback feature. The pins are diametrically opposite to one another.

Under normal conditions, both pins 56 and 58 are housed within their passages 60, 62 in the annular body 52 and provide no resistance to free relative rotation of the castellated rim 50 inside the body 52. The wheel in therefore free to rotate on its spindle in either direction.

In order to brake the wheel, the pin 56 has to move radially inwards so that its tip 64 engages between two of the castellations of the rim 50, and a spring is positioned behind the pin to drive the pin inwards. In this position, relative movement between the rim 50 and the body 52 is locked and there can then be no movement between the wheel and the spindle 30. In other words the wheel is fully braked.

If the pin 56 is withdrawn and in its place the pin 58 is driven inwards (likewise by a spring), then the shape of the tip 66 of the pin 58 engaging against the teeth 50 will allow rotation of the wheel in one direction, but will prevent rotation in the opposite direction, in the manner of a ratchet.

In order to move either one or the other of the pit 56, 58 in the manner described, a cover disc 68 is used. The pins 56, 58 are controlled by movable pegs 70 which extend axially through slots 72 through the walls of the passages 60, 62 and into the ping 56,58 (See FIG. 14). The top ends of these pegs 70 engage in tracks 74, 76 on the inside of the cover disc 68. The location of these tracks 74, 76 is indicated in dotted lines in FIG. 2 and can be seen clearly in FIGS. 8 and 9 which show the inside of the disc 68. It will be seen that the tracks 74, 76 have a centre position; extending in one direction from this centre position is a track region of constant radius and extending in the other direction is a track region where the radius of the track continually reduces.

Figure 2:
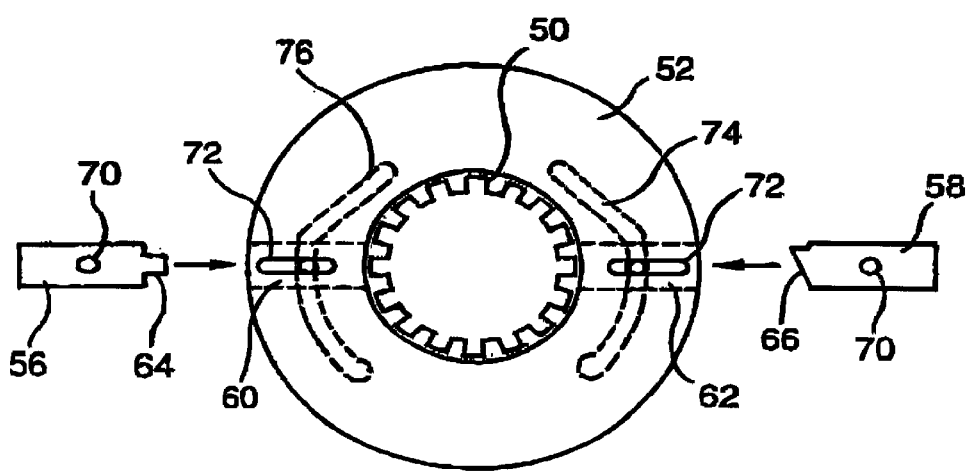
FIG. 2 is an exploded view of a manually operable changing device forming part of the hub of FIG. 1.

FIG. 2 illustrates the situation where the cover disc 68 is in its middle position relative to the annular body 52 and where the pins 56 and 58 are not activated. Turning the cover disc 68 in one direction relative to the annular body 52 causes one of the pegs 70 to move radially inwards and to force the corresponding pin 56, 58 inwards to engage with the teeth 50. Because the corresponding region of the opposite track is of constant radius, there is no effect on the position of the opposite pin.

Rotating the cover disc in the opposite direction however produces movement of the opposite pin.

Both pins 56 and 58 are spring-loaded in a radially inward direction, and are held out of engagement, against the spring pressure by the engagement of the pegs 70 in the tracks 74, 76.

On the outside of the cover disc 68, there in a scalloped rim 80 to allow the cover disc to be gripped by the user so that it can be turned either clockwise or anti-clockwise, depending on the function which is to be engaged. However the cover disc 60 has no projecting parts, so that braking and anti-rollback functions cannot be accidentally engaged.

FIG. 15 shows an alternative construction. In this embodiment, the annular disc 52 of FIG. 2 in replaced by two diametrically apposite guide bodies 152 which have parallel guide surfaces 155 for a slidable lock member 153. The guide bodies 152 are fixed to, or are made integral with the flange 154 of the hub body. For example, the flange 154 and the guide bodies may be made as a single casting.

The lock member 153 a central aperture 157 within which a splined wheel 150 (fast with the spindle 30,130) is received. In the middle position shown in FIG. 16, the wheel 150, and thus the spindle on which it is mounted, is free to rotate relative to the flange 154/guide bodies 152.

The aperture 157 of the lock member has, at one point around its circumference, two square profile teeth 164, the profiles of these teeth matching the profiles of the splines on the wheel 150. At an opposite point, the lock member has two ratchet teeth 166. The aperture 157 has flattened portions at 159 which separate the two sets of teeth.

It will be clear from FIG. 16 that the lock member can be moved to the right from its freewheeling position shown in the Figure until the teeth 164 engage the splines. The lock member will then be rotationally locked to the wheel 150 and the spindle 130. Attempted rotation of the spindle and splined wheel 150 will then also require rotation of the lock member, but such rotation will be blocked by abutment between the parallel surfaces of the lock member and the guide bodies 152. The wheel is therefore locked in this position.

In a similar manner, movement of the lock member 153 to the left will bring the ratchet teeth 166 into engagement with the splines of the wheel 150, and, as previously described, the engagement between the teeth and the splines will allow relative rotation in one direction but not in the opposite direction. Thus an anti-roll-back facility is achieved.

Movement of the lock member 153 is controlled by two leaf springs 161,163 and a cover 168. The leaf springs (which are not shown in FIG. 15) are fixed on the inside of a rim 169 of the cover 168, are mirror images of one another and are stressed against the ends of the lock member 153. In the middle position shown in FIG. 16, the springs are in balance, each exerting the same force on the lock member such that the lock member stays in its central position.

The end profiles 171,173 of the lock member 153 are designed to cooperate with the springs 161 so that

- as the cover is turned clockwise (FIG. 16) a larger diameter part of the end profile 171 presses against the spring 161 which increase the pressure on the lock member pushing it to the right
- at the opposite end of profile 173, the spring 163 first rides over the nose 175 and then falls into a smaller diameter part of the end profile 173. The force being exerted by the spring 161 is thus greater than that exerted by spring 163, and the lock member is moved to the right into the locked or braking position.
- because the spring 163 has passed the nose 175, the cover 168 and the lock member will be held in this position. To return to the middle position, rotational force has to be applied again to the cover to make the spring 163 ride back over the nose 175.

In order to achieve the anti-rollback position, the same sequence is followed, but the initial Station of the cover 168 is in an anti-clockwise direction.

In comparison with the embodiment of FIGS. 2 and 10 to 14, this embodiment has fewer components and thus is easier and cheaper to both manufacture and assemble. The locking member 153 can be formed from an extrusion having a cross-sectional shape as shown, the locking members then constituting slices cut from the extruded length.

FIGS. 17 and 18 show a modified form of spindle 130. At the right hand end, the hollow spindle has a flat 181 onto which the splined wheel 150 is force-fitted. The D-shape ensures that there is no relative rotation between the wheel and the spindle. Instead of thin shape, there could be mating splines on the end of the spindle 130 and on the internal diameter of the wheel 150. A short length of thread 183 is provided to enable a lock-nut to be fitted, if necessary.

The other end of the spindle fits within a bore 123 in a collar lie which is of a similar form and function to the collar 18 which has already been described. The spindle has a shoulder 132 which mates with a socket 120 on the end of the collar. The socket has a diametral slot 123 which receives the shoulder 132. The slot 123 has an upstanding pin 125 and the shoulder has corresponding holes 127 When the collar and spindle are correctly assembled, the pin 125 locates in one of the holes 127. The pin and the holes can be off-centre, and the collars can be handed so that a heel intended for the right hand side of a wheelchair cannot be fitted to the left hand side, and vice versa.

What is claimed is:

1. A wheel hub which comprises a spindle, a sleeve rotatable relative to the spindle, a bearing between the sleeve and the spindle to allow said relative rotation, and a manually operable device which has three operating positions, a first of which allows free rotation between the spindle and the sleeve, a second of which locks the spindle to the sleeve to effect a braking action, and a third of which engages a ratchet arrangement which allows the spindle to rotate relative to the sleeve in one direction only, characterised in that the manually operable device is fitted on the hub and a splined annular surface on the spindle surrounded by a body on the sleeve which has a recess in which the splined surface lies so that the body is free to rotate relative to the spindle and the splined surface on the spindle, when the hub takes up the first operating position, the device also including a first pin or pins, fixed against rotation relative to the sleeve, which can be moved from a retracted position into the path of relative rotational movement between the body and the splined annular surface to put the hub into the second operating position and to engage with the splines and to thus prevent rotation of the sleeve relative to the spindle and a second pin or pins, also fixed against rotation relative to the sleeve, which can be moved into the path of relative rotational movement between the body and the splined annular surface, when the first pin or pins is in a retracted position, to put the hub into the third operating position and to engage with the splines and to prevent rotation of the sleeve in one rotational direction relative to the spindle but to allow rotation in the opposite rotation direction.

2. A wheel hub as claimed in claim 1, wherein the selection of one of the three positions is carried out by manipulating a selector mounted on the hub itself.

3. A wheel hub as claimed in claim 2, wherein the selector is a rotatable disc mounted for rotation about an axis coincident with the hub axis.

4. A wheel hub as claimed in claim 3, wherein the selector has a central position corresponding to the first operating position, with the second and third operating positions being reached by rotating the selector in one direction for the second operating position and in the opposite direction for the third operating position.

5. A wheel hub as claimed in claim 3, wherein the disc has a radially outwardly extending lever to enable it to be turned.

6. A wheel hub as claimed in claim 3, wherein the disc has a circumferential surface modified to allow it to be gripped and turned.

7. A wheel hub as claimed in claim 6, wherein the circumferential surface is provided with a rubber ring.

8. A wheel hub as claimed in claim 6, wherein the circumferential surface is formed with a type of knurling or similar to increase grip.

9. A wheel hub as claimed in claim 1, adapted for use on the wheels of a wheelchair.

10. A wheel hub as claimed in claim 9, wherein the spindle is provided with a mounting bracket by which it can be non-rotatably mounted on a wheelchair frame.

11. A wheel hub as claimed in claim 10, wherein the bracket has axially extending pins or sockets which engage with axially extending sockets or pins on the hub.

12. A wheel hub as claimed in claim 9, provided with a quick detachment mechanism enabling the hub together with a wheel attached to the hub- to be quickly and easily detached from the wheelchair frame.

13. A wheel hub as claimed in claim 12, wherein the quick detachment mechanism comprises a radial projection at the inner end of the spindle, which projection can be retracted to enable the spindle to be inserted in or withdrawn from the mounting bracket.

14. A wheel hub as claimed in claim 1, wherein the first pin or pins have square end profiles which engage between splines on the splined surfaces.

15. A wheel hub as claimed in claim 1, wherein the second pin or pins have end profiles with one square face and one ramp face which engage between splines on the splined surfaces, so that the square face prevents rotation of the sleeve in one rotational direction relative to the spindle and the ramp face allows rotation in the opposite rotation direction.

16. A wheel hub as claimed in claim 1, wherein the first pin or pins are diametrically opposite, referred to the spindle axis to the second pin or pins.

17. A wheel hub as claimed in claim 1, wherein the body on the sleeve has radially extending passages communicating with the recess and the pins are radially movable pins which can move in and out of the recess to engage, one at a time, with the splined surface.

18. A wheel hub as claimed in claim 17, wherein the radially movable pins have lateral lugs which engage in cam tracks inside the selector so that movement of the selector in one rotational direction extends the first pins and movement in the opposite rotational direction extends the second pins.

19. A wheel hub as claimed in claim 1, wherein the body on the sleeve comprises a radially movable slide plate moving between two fixed parallel slide guides such that the plate can move radially but cannot rotate relative to the guides, the recess being provided in the slide plate and the pins being formed integrally with the plate at opposite regions of the circumference of the recess.

20. A wheel hub as claimed in claim 19, wherein leaf springs mounted internally on the selector bias the opposite ends of the slide plate and the slide plate ends and the leaf springs are designed so that movement of the selector in each direction causes the leaf springs to ride over a nose on the slide plate so that the selector is held in one or other end position until the selector is manually operated to a different position.

21. A wheel hub as claimed in claim 1, wherein there are two first pins and two second pins.

22. A wheel hub as claimed in claim 1, wherein the hub is attached to a wheelchair.

23. A wheel hub as set forth in claim 22, wherein the hub has attached thereto a wheel.

* * * * *